United States Patent
Qin et al.

(10) Patent No.: US 9,553,826 B2
(45) Date of Patent: Jan. 24, 2017

(54) REAL-TIME SHARING METHOD, APPARATUS AND SYSTEM

(71) Applicant: Huawei Technologies Co., Ltd., Shenzhen (CN)

(72) Inventors: Jin Qin, Nanjing (CN); Pei Dang, Nanjing (CN); Deepanshu Gautam, Nanjing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 244 days.

(21) Appl. No.: 14/197,415

(22) Filed: Mar. 5, 2014

(65) Prior Publication Data

US 2014/0189133 A1 Jul. 3, 2014

Related U.S. Application Data

(63) Continuation of application No. PCT/CN2012/078608, filed on Jul. 13, 2012.

(30) Foreign Application Priority Data

Sep. 9, 2011 (CN) .......................... 2011 1 0268467

(51) Int. Cl.
*G06F 15/16* (2006.01)
*H04L 12/911* (2013.01)
(Continued)

(52) U.S. Cl.
CPC ............... *H04L 47/78* (2013.01); *G06F 9/455* (2013.01); *G06F 9/468* (2013.01);
(Continued)

(58) Field of Classification Search
CPC .......... H04L 47/78; H04L 67/02; H04L 51/04; H04L 67/04; H04L 67/2814; H04L 63/10; G06F 15/16
(Continued)

(56) References Cited

U.S. PATENT DOCUMENTS 6,594,688 B2 * 7/2003 Ludwig .................. G06Q 10/10
370/286
7,404,014 B2  7/2008 Mairs et al.
(Continued)

FOREIGN PATENT DOCUMENTS

CN  1774707 A  5/2006
CN  101170575 A  4/2008
(Continued)

OTHER PUBLICATIONS

Foreign Communication From a Counterpart Application, PCT Application No. PCT/CN2012/078608, English Translation of International Search Report dated Oct. 25, 2012, 2 pages.
(Continued)

*Primary Examiner* — Tesfay Yohannes
(74) *Attorney, Agent, or Firm* — Conley Rose, P.C.

(57) ABSTRACT

A real-time sharing method, apparatus and system, which relate to the online application field to solve the problem that a user cannot actively send a request to another terminal by using a terminal according to a personal requirement to implement real-time sharing of resources of an online application of another terminal. The real-time sharing method for sharing of an online application includes: receiving a browsing request message sent by a first terminal, where the browsing request message carries an identifier of a second terminal; acquiring, according to the identifier of the second terminal, virtual machine information of a virtual machine that provides an online application service for the second terminal; and sending, to the first terminal, resource information sent to the second terminal by the virtual machine corresponding to the virtual machine information.

12 Claims, 8 Drawing Sheets

(51) Int. Cl.
| | |
|---|---|
| *H04L 29/06* | (2006.01) |
| *G06F 9/455* | (2006.01) |
| *G06F 17/30* | (2006.01) |
| *G06F 9/46* | (2006.01) |
| *H04L 12/58* | (2006.01) |
| *H04L 29/12* | (2006.01) |
| *H04L 29/08* | (2006.01) |

(52) U.S. Cl.
CPC ........ *G06F 17/30899* (2013.01); *H04L 51/04* (2013.01); *H04L 61/1541* (2013.01); *H04L 63/08* (2013.01); *H04L 63/10* (2013.01); *H04L 67/28* (2013.01); *H04L 67/2814* (2013.01); *H04L 29/08846* (2013.01); *H04L 67/04* (2013.01); *H04L 67/08* (2013.01)

(58) Field of Classification Search
USPC .......................... 709/203, 204, 226; 370/352
See application file for complete search history.

(56) References Cited

U.S. PATENT DOCUMENTS

| | | | | |
|---|---|---|---|---|
| 7,656,880 | B1* | 2/2010 | Jones | H04L 47/10 370/395.21 |
| 7,660,007 | B2* | 2/2010 | Uchida | H04N 1/00132 358/1.13 |
| 7,865,506 | B1* | 1/2011 | Pedersen | H04L 29/06 707/726 |
| 2001/0049719 | A1* | 12/2001 | Nakajima | H04L 29/06 709/203 |
| 2003/0145062 | A1* | 7/2003 | Sharma | G06F 17/30905 709/217 |
| 2004/0225716 | A1 | 11/2004 | Shamir et al. | |
| 2005/0021626 | A1 | 1/2005 | Prajapat et al. | |
| 2007/0013515 | A1* | 1/2007 | Johnson | A63F 13/10 340/568.1 |
| 2007/0260702 | A1 | 11/2007 | Richardson et al. | |
| 2008/0075067 | A1* | 3/2008 | Guglielmi | H04W 76/023 370/352 |
| 2008/0095151 | A1 | 4/2008 | Kawazoe et al. | |
| 2010/0162129 | A1* | 6/2010 | Morris | G06F 9/4443 715/745 |
| 2011/0231882 | A1 | 9/2011 | Wang et al. | |
| 2013/0060679 | A1* | 3/2013 | Oskolkov | G06Q 20/02 705/39 |

FOREIGN PATENT DOCUMENTS

| | | |
|---|---|---|
| CN | 102165723 A | 8/2011 |
| EP | 1018689 A2 | 7/2000 |

OTHER PUBLICATIONS

Foreign Communication From a Counterpart Application, PCT Application No. PCT/CN2012/078608, English Translation of Written Opinion dated Oct. 25, 2012, 9 pages.
Foreign Communication From a Counterpart, European Application No. 12830613.1, Extended European Search Report dated Oct. 30, 2014, 8 pages.
Foreign Communication From a Counterpart Application, European Application No. 12830613.1, Communication Under Rule 71(3) EPC dated Dec. 11, 2015, 7 pages.

* cited by examiner

REAL-TIME SHARING METHOD, APPARATUS AND SYSTEM

CROSS-REFERENCE TO RELATED APPLICATIONS

This application is a continuation of International Application No. PCT/CN2012/078608, filed on Jul. 13, 2012, which claims priority to Chinese Patent Application No. 201110268467.0, filed on Sep. 9, 2011, both of which are hereby incorporated by reference in their entireties.

TECHNICAL FIELD

The present invention relates to the field of online applications, and in particular, to a real-time sharing method, apparatus and system.

BACKGROUND

Currently, in an online application field of a network, a server may deploy various applications developed by third parties, and a terminal may remotely connect to an online application platform of the server to experience the applications. A general interaction process between the terminal and the server is that the terminal submits a message about an operation on an application to the server, and the server performs computation and processing, and returns a data running process and result response message, so that the terminal locally outputs the received data. In this scenario, the running and processing of the application are both performed on the server, and the terminal is only responsible for uploading an operation of a user to the server, receiving data sent by the server, decoding the data, and outputting the decoded data; therefore, the user may browse, by using the terminal (such as a personal computer, a mobile phone, and a palmtop computer), audio/video resources provided by the server.

During implementation of the foregoing technical solution, the inventor finds that a virtual machine can provide a service only for a terminal using an application on the virtual machine. This also causes imperfectness of an online application function, and impairs the quality of user experience.

SUMMARY

Embodiments of the present invention provide a real-time sharing method, apparatus and system in an online application, thereby further improving functions of the online application and improving the quality of user experience in the online application.

To achieve the foregoing objectives, the embodiments of the present invention adopt the following technical solutions:

According to one aspect, a real-time sharing method is provided, which is applied to an online application system, and includes: receiving a browsing request message sent by a first terminal, where the browsing request message carries an identifier of a second terminal; acquiring, according to the identifier of the second terminal, virtual machine information of a virtual machine that provides an online application service for the second terminal; and sending, to the first terminal, resource information sent to the second terminal by the virtual machine corresponding to the virtual machine information.

Before the sending, to the first terminal, resource information sent to the second terminal by the virtual machine corresponding to the virtual machine information, the method further includes: detecting whether the first terminal has permission to browse an online application being used by the second terminal; when the first terminal has the permission to browse the online application being used by the second terminal, sending, to the first terminal, the virtual machine information of the virtual machine that provides the online application service for the second terminal; and establishing a connection between the first terminal and the virtual machine, where the sending, to the first terminal, resource information sent to the second terminal by the virtual machine corresponding to the virtual machine information includes sending, to the first terminal by using the established connection, the resource information that runs on the virtual machine corresponding to the virtual machine information.

When the first terminal does not have the permission to browse the online application being used by the second terminal, the method further includes: sending a permission verification request message to the second terminal, where the permission verification request message includes an identifier of the first terminal and information requesting the second terminal to grant the browse permission to the first terminal, so that the second terminal determines, according to the identifier of the first terminal, whether to grant the browse permission to the first terminal; receiving a permission verification notification message returned by the second terminal; and determining, according to the permission verification notification message, that the first terminal has the browse permission.

After the sending, to the first terminal, resource information sent to the second terminal by the virtual machine corresponding to the virtual machine information, the method further includes: receiving a virtual machine control request message sent by the first terminal, where the virtual machine control request message includes a control command used to control a virtual machine that provides the resource information for the second terminal; detecting whether the first terminal is a preset control terminal; and when the first terminal is the preset control terminal, controlling the virtual machine according to the control command in the virtual machine control request message.

After the sending, to the first terminal, resource information sent to the second terminal by the virtual machine corresponding to the virtual machine information, the method further includes: receiving an application control request message sent by the first terminal, where the application control request message is used to apply for permission to control the application that provides the online application service for the second terminal; sending an application control permission request message to the second terminal, where the application control permission request message includes the identifier of the first terminal, so that the second terminal determines, according to the identifier of the first terminal, whether to grant the permission to control the application to the first terminal, and returns an application control permission notification message; and sending the application control permission notification message to the first terminal, so that when the application control permission notification message indicates granting the permission to control the application to the first terminal, the first terminal controls the application that provides the online application service for the second terminal.

According to another aspect, a server is provided, which includes: a request message receiving unit configured to receive a browsing request message sent by a first terminal, where the browsing request message carries an identifier of a second terminal; a virtual machine acquiring unit configured to acquire, according to the identifier of the second terminal, virtual machine information of a virtual machine that provides an online application service for the second terminal; and a resource sending unit configured to send, to the first terminal, resource information sent to the second terminal by the virtual machine corresponding to the virtual machine information.

The virtual machine acquiring unit further includes: a browse permission detecting subunit configured to, when the browsing request message sent by the first terminal is received, detect whether the first terminal has permission to browse an online application being used by the second terminal; an information sending subunit configured to, when the first terminal has the permission to browse the online application being used by the second terminal, send, to the first terminal, the virtual machine information of the virtual machine that provides the online application service for the second terminal; and a connection establishing subunit configured to establish a connection between the first terminal and the virtual machine.

The virtual machine acquiring unit further includes: a permission verification sending subunit configured to, when the first terminal does not have the a browse permission, send a permission verification request message to the second terminal, where the permission verification request message includes an identifier of the first terminal and information requesting the second terminal to grant the browse permission to the first terminal, so that the second terminal determines, according to the identifier of the first terminal, whether to grant the browse permission to the first terminal; and a permission verification receiving subunit configured to receive a permission verification notification message returned by the second terminal; and determine, according to the permission verification notification message, that the first terminal has the browse permission, where the information sending subunit is further configured to, when the permission verification notification message indicates granting the browse permission to the first terminal, send, to the first terminal, the virtual machine information of the virtual machine that provides the online application for the second terminal.

The request message receiving unit is further configured to receive a virtual machine control request message sent by the first terminal, where the virtual machine control request message includes a control command used to control a virtual machine that provides the resource information for the second terminal; and the server further includes a virtual machine control permission detecting unit configured to detect whether the first terminal is a preset control terminal; and a virtual machine controlling unit configured to, when the first terminal is the preset control terminal, control the virtual machine according to the control command in the virtual machine control request message.

The request message receiving unit is further configured to receive an application control request message sent by the first terminal, where the application control request message is used to apply for permission to control the application that provides the online application service for the second terminal; and the server further includes an application control permission application unit configured to send an application control permission request message to the second terminal, where the application control permission request message includes the identifier of the first terminal and an application identifier, so that the second terminal determines, according to the identifier of the first terminal and the application identifier, whether to grant the permission to control the application to the first terminal, and returns an application control permission notification message; and an application control permission notification unit configured to send the application control permission notification message to the first terminal, so that when the application control permission notification message indicates granting the permission to control the application to the first terminal, the first terminal controls the application that provides the online application service for the second terminal.

A first terminal is provided, which includes: a request message sending unit configured to send a browsing request message to a server, where the browsing request message carries an identifier of a second terminal, so that the server acquires, according to the identifier of the second terminal, virtual machine information of a virtual machine that provides an online application service for the second terminal; a virtual machine information receiving unit configured to, when the first terminal has permission to browse an online application being used by the second terminal, receive the virtual machine information of the virtual machine that provides the online application service for the second terminal; and a resource information receiving unit configured to receive resource information sent to the second terminal by the virtual machine corresponding to the virtual machine information.

The request message sending unit is further configured to send a virtual machine control request message to the server, where the virtual machine control request message includes a control command used to control the virtual machine that provides the resource information for the second terminal, so that the server, when detecting that the first terminal is a preset control terminal, controls the virtual machine according to the control command in the virtual machine control request message.

The request message sending unit is further configured to send an application control request message to the server, where the application control request message is used to apply for permission to control the application that provides the online application service for the second terminal; and the first terminal further includes an application control permission notification message receiving unit configured to receive the application control permission notification message, so that when the application control permission notification message indicates granting the permission to control the application to the first terminal, the first terminal controls the application that provides the online application service for the second terminal.

According to still another aspect, a real-time sharing system is provided, which includes a server configured to receive a browsing request message sent by a first terminal, where the browsing request message carries an identifier of a second terminal, and configured to send, to the first terminal, resource information sent to the second terminal by the virtual machine corresponding to the virtual machine information; and the first terminal configured to send the browsing request message to the server.

The server is further configured to detect whether the first terminal has permission to browse an online application being used by the second terminal; when the first terminal has the permission to browse the online application being used by the second terminal, send, to the first terminal, the virtual machine information of the virtual machine that provides the online application service for the second terminal; establish a connection between the first terminal and the virtual machine; and send, to the first terminal by using the established connection, resource information that runs on the virtual machine corresponding to the virtual machine information.

The server is further configured to, when the first terminal does not have the browse permission, send a permission verification request message to the second terminal, where the permission verification request message includes an identifier of the first terminal and information requesting the second terminal to grant the browse permission to the first terminal, so that the second terminal determines, according to the identifier of the first terminal, whether to grant the browse permission to the first terminal; and receive a permission verification notification message returned by the second terminal, and determine, according to the permission verification notification message, that the first terminal has the browse permission.

The server is further configured to receive a virtual machine control request message sent by the first terminal, where the virtual machine control request message includes a control command used to control a virtual machine that provides the resource information for the second terminal; detect whether the first terminal is a preset control terminal, and when the first terminal is the preset control terminal, control the virtual machine according to the control command in the virtual machine control request message.

The first terminal is further configured to send an application control request message to the server, where the application control request message is used to apply for permission to control an application on the virtual machine that provides the online application service for the second terminal; the server is further configured to: when receiving the application control message, send an application control permission request message to the second terminal, where the application control permission request message includes the identifier of the first terminal and an application identifier; the second terminal is configured to receive the application control permission request message, determine, according to the identifier of the first terminal and the application identifier, whether to grant the permission to control the application to the first terminal, and return an application control permission notification message; and the server is further configured to send the application control permission notification message to the first terminal, so that when the application control permission notification message indicates granting the permission to control the application to the first terminal, the first terminal controls the application that provides the online application service for the second terminal.

The embodiments of the present invention provide a real-time sharing method, apparatus and system, so that a user can actively send a request to a terminal of another user according to a personal requirement in an online application scenario, and can implement real-time browsing of resources of an online application of another terminal if having browse permission; at the same time, if the user has virtual machine control permission, the user may suspend or shut down a virtual machine, on a server, that provides an online service for another terminal; when being granted permission to control an application, the user may acquire, by sending an instruction to the server, control permission for an online application of another user, and control running of the application at a virtual machine end, thereby implementing real-time sharing in the online application, further improving functions of the online application, and improving the quality of user experience in the online application.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

The following embodiments are all applied to an online application scenario, and therefore in a server, a virtual machine that provides an online application for a second terminal exists, that is, the second terminal that is performing the online application exists.

Figure 1:
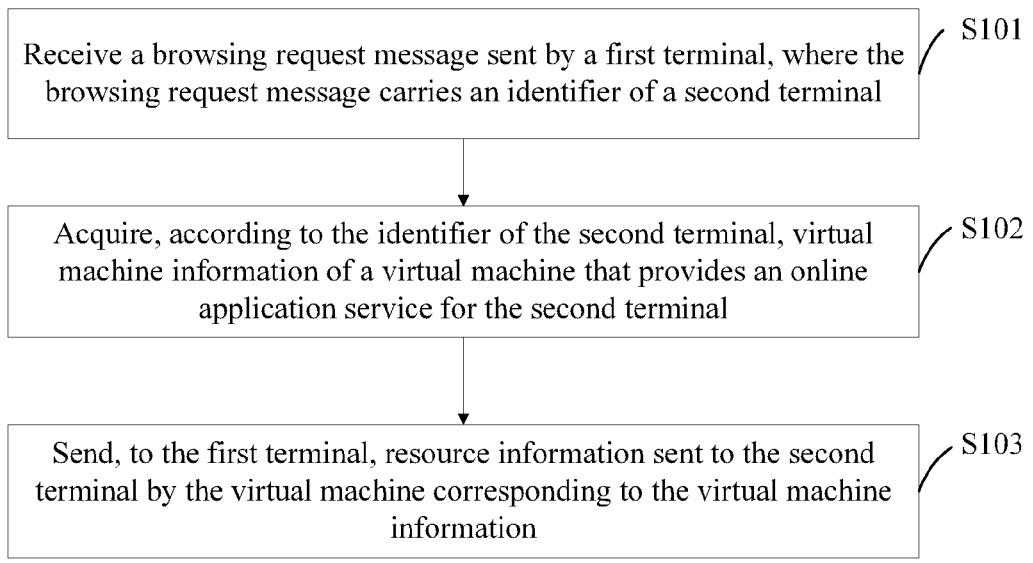
FIG. 1 is a flowchart of a real-time sharing method according to an embodiment of the present invention.

A real-time sharing method provided by an embodiment of the present invention is applied to an online application, as shown in FIG. 1, applied to a server side, and includes the following steps:

S101: Receive a browsing request message sent by a first terminal, where the browsing request message carries an identifier of a second terminal.

Specifically, the server receives the browsing request message sent by the first terminal, where the browsing request message is used to request to synchronously send, to the first terminal, resource information sent to the second terminal, and the request message carries the identifier of the second terminal.

S102: Acquire, according to the identifier of the second terminal, virtual machine information of a virtual machine that provides an online application service for the second terminal.

After a user sends the browsing request message to the server by using the first terminal, the server acquires, according to the identifier of the second terminal carried in the browsing request message, the virtual machine information of the virtual machine that provides a service for the second terminal. For example, the virtual machine is delivering an image and an audio file of a program that runs on the virtual machine to the second terminal.

S103: Send, to the first terminal, resource information sent to the second terminal by the virtual machine corresponding to the virtual machine information.

After acquiring the corresponding virtual machine, the virtual machine that provides the online application service for the second terminal synchronously sends, to the first terminal, the resource information sent to the second terminal to implement sharing of the online application. Here, the resource information includes audio/video information on the virtual machine that is provided for the second terminal.

The embodiment of the present invention provides a real-time sharing method in an online application, so that a user can actively send a browsing request to a server according to a personal requirement to implement real-time browsing of resources of the online application being used by a second terminal, thereby further improving functions of the online application and improving the quality of user experience in the online application.

Figure 2:
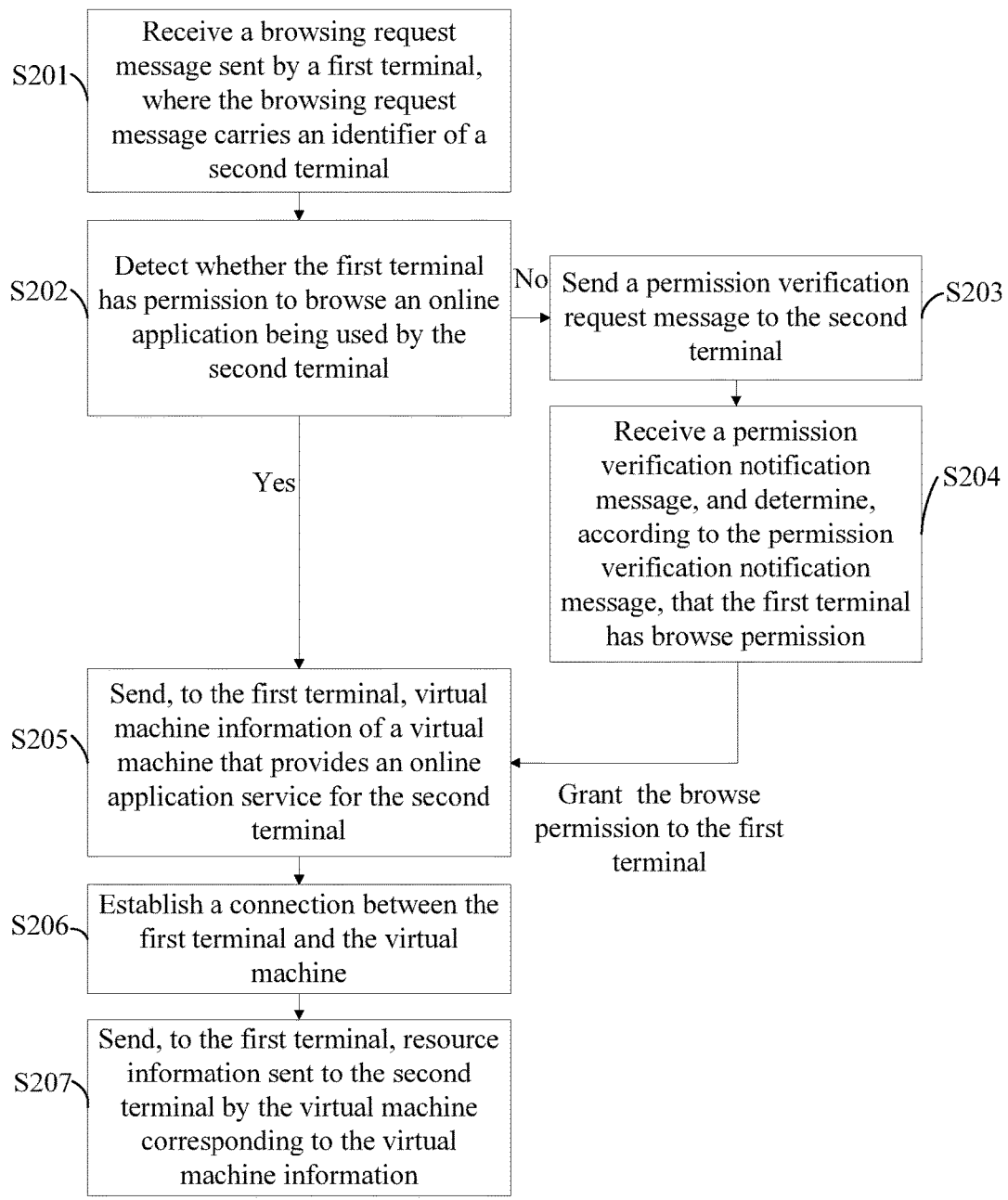
FIG. 2 is a flowchart of another real-time sharing method according to an embodiment of the present invention.

Another real-time sharing method provided in an embodiment of the present invention, as shown in FIG. 2, is applied to a server side, and includes the following steps:

S201: Receive a browsing request message sent by a first terminal, where the browsing request message carries an identifier of a second terminal.

S202: Detect whether the first terminal has permission to browse an online application being used by the second terminal.

If the first terminal has the permission to browse the online application being used by the second terminal, perform step S205; otherwise, perform step S203. Verification of the permission to browse the online application being used by the second terminal may be looking up a permission table stored on the server, and specifically, the permission table may be established on the server, where the table includes several groups of identifiers of the first terminal and the second terminal, and browsing permission in a one-to-one correspondence with the identifiers of the terminals; when it is required to detect whether the first terminal has the browse permission, it is only required to perform compare the identifier of the first terminal with the identifiers stored in the permission table.

S203: Send a permission verification request message to the second terminal.

Specifically, because the permission table does not have a user browsing permission record of the first terminal, in this case, the server sends, to the second terminal, the permission verification request message including the identifier of the first terminal and information requesting the second terminal to grant the browse permission to the first terminal, so that a user of the second terminal decides, according to the identifier of the first terminal, whether to grant to the first terminal the permission to browse the online application being used by the second terminal.

S204: Receive a permission verification notification message, and determine, according to the permission verification notification message, that the first terminal has the browse permission.

If the permission verification notification message indicates granting to the first terminal the permission to browse the online application being used by the second terminal, perform step S205; otherwise, the first terminal cannot browse the online application of the second terminal.

S205: Send, to the first terminal, virtual machine information of a virtual machine that provides an online application service for the second terminal.

Here, the virtual machine information may be, but is not limited to, virtual machine address information, virtual machine port information, and online application information, and the online application information includes an application type, application runtime, account running time, application evaluation content, application rating, and/or application recommendation rating.

S206: Establish a connection between the first terminal and the virtual machine.

It should be noted that, during establishment of the connection between the first terminal and the virtual machine, it is required to perform negotiation on a media capability. The media capability includes, but is not limited to, a network environment, a coding manner, and a frame rate parameter.

S207: Send, to the first terminal, resource information sent to the second terminal by the virtual machine corresponding to the virtual machine information.

Here, the resource information includes audio/video information provided on the virtual machine for the second terminal.

Figure 3:
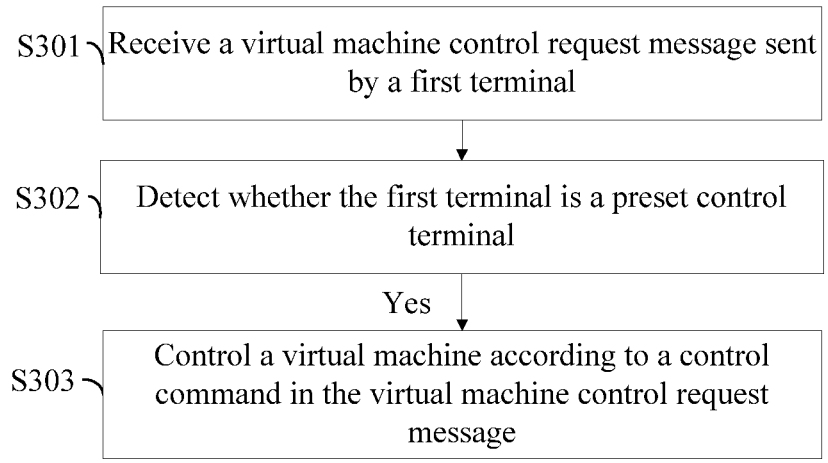
FIG. 3 is a flowchart of a virtual machine controlling method in real-time sharing according to an embodiment of the present invention.

Here, the user can actively send the browsing request according to a personal requirement to implement real-time browsing and viewing of resources of the online application of the second terminal; in this case, the user can further suspend or shut down, by sending a virtual machine control request message, the virtual machine that provides the online application for the second terminal, or can apply for, by sending an application control request message, permission to control the online application of the second terminal that is running on the virtual machine, and a specific process of the method is as follows:

FIG. 3 is a flowchart of a method for sending a virtual machine control request message, and the method includes the following steps:

S301: Receive a virtual machine control request message sent by a first terminal.

It should be noted that, the virtual machine control request message includes a control command used to control a virtual machine that provides resource information for a second terminal, so that the first terminal performs controlling on the virtual machine. The control command includes, but is not limited to, a shutdown or suspension instruction for the virtual machine.

S302: Detect whether the first terminal is a preset control terminal.

The process may be looking up a permission table stored on the server, and specifically, the permission table may be established on the server, where the table includes several groups of identifiers of the first terminal and the second terminal, and the permission table has a control permission record of the first terminal for a virtual machine that provides an online application for the second terminal; when it is required to detect whether the first terminal is the preset control terminal, it is only required to compare the identifier of the first terminal with the identifiers stored in the permission table. If it is detected that the first terminal is the preset control terminal, perform step S303.

S303: Control the virtual machine according to the control command in the virtual machine control request message.

Specifically, the control by the first terminal on the virtual machine includes shutting down and suspending the virtual machine that is providing the online application service for the second terminal. Here, the control permission of the virtual machine is generally set as super permission, so that while monitoring the online application of the second terminal, the first terminal may, if finding that the currently running application is not suitable for a user of the second terminal, send a control instruction of shutting down the virtual machine to stop running of the corresponding virtual machine, and send a notification message to the second terminal, thereby achieving the objective of controlling the second terminal to run the online application.

Figure 4:
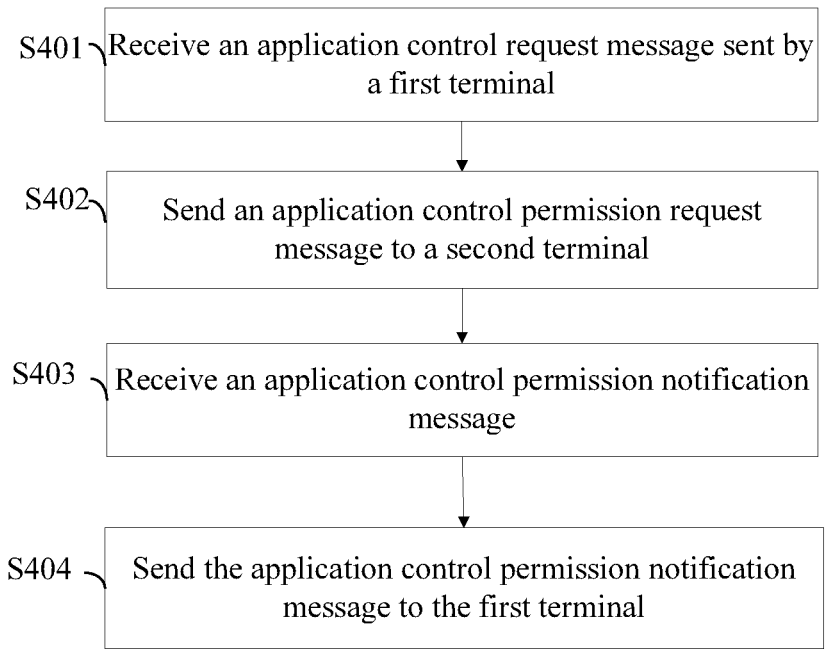
FIG. 4 is a flowchart of an application controlling method in real-time sharing according to an embodiment of the present invention.

FIG. 4 is a flowchart of a method for sending an application control request message, and the method includes the following steps:

S401: Receive an application control request message sent by a first terminal.

It should be noted that, the application control request message is used to apply for permission to control an application that provides an online application service for a second terminal.

S402: Send an application control permission request message to the second terminal, where the application control permission request message includes an identifier of the first terminal and an application identifier, so that the second terminal determines, according to the identifier of the first terminal and the application identifier, whether to grant the permission to control the application to the first terminal, and returns an application control permission notification message.

Because the control on the online application is carried out in real time, the first terminal needs to apply for the permission to control the application if it intends to control the online application of the second terminal. The second terminal determines, according to the identifier of the first terminal and the application identifier in the application control permission request message, whether to grant permission to control the application to the first terminal, and returns the application control permission notification message to a server. As an example, the application control permission requesting message may further not include the application identifier, and when the application control permission requesting message does not include the application identifier, it indicates that the first terminal applies for controlling all online applications being used by the second terminal.

S403: Receive the application control permission notification message.

S404: Send the application control permission notification message to the first terminal.

Here, the server needs to send the application control permission notification message to the first terminal, so that when the application control permission notification message indicates granting the permission to control the application to the first terminal, the first terminal controls an application that provides the online application service for the second terminal. In this case, the first terminal uploads, by using a connection with the virtual machine, a specific application control instruction to the virtual machine to control the online application on the virtual machine. Because the virtual machine establishes a connection relationship with both the first terminal and the second terminal, a result of the first terminal controlling the online application on the virtual machine, that is, resource information that runs on the virtual machine, may be sent to the two terminals in real time.

In this way, a user not only implements, by using the first terminal, browsing resources of the online application of the second terminal in real time; at the same time, the user can also implement, by using the first terminal, a shutdown or suspension operation on the virtual machine that is on the server and provides the online service for the second terminal, and in addition, when the first terminal is granted the permission, the first terminal may control the online application of the second terminal, thereby implementing real-time sharing of the online application, further improving functions of the online application and improving the quality of user experience in the online application.

The following describes the implementation of this embodiment of the present invention by using an example.

Specifically, the real-time sharing method in an online application provided in this embodiment of the present invention may be applied to the following scenario: when several second terminals use online applications, a user needs to use a first terminal to actively share, that is, browse or control, an online application of a certain second terminal that the user is interested in according to a personal requirement, where the control includes controlling on a virtual machine and controlling on an application on the virtual machine.

First, for the sake of convenience, a service request parameter format table is set on a server. For example, Table 1 lists formats of a service request message, and specifically, Service_Type in the table is used to indicate a service request type, for example, the first terminal sends an application use request message to the server, Service_Type included in the message is "0", Service_Parameter is an identifier of an application, that is, a name or symbol of the application, and in this case, what is to be provided by the server for the first terminal is an online application service; the first terminal sends a browsing request message to the server, Service_Type included in the message is "1", Service_Parameter is an identifier of the second terminal, and in this case, what is to be provided by the server for the first terminal is a browsing service; the first terminal sends a virtual machine control request message to the server, Service_Type included in the message is "2", and Service_Parameter is a specific control instruction (including, but not limited to, suspending or shutting down the virtual machine that provides the online application service for the second terminal); the first terminal sends an application control request message to the server, Service_Type included in the message is "3", and Service_Parameter is an application control permission requesting message.

Table 1 lists the formats of the service request message, where Service_Type includes parameters 0, 1, 2, and 3 for indicating which type of service is requested by the terminal, 0 indicates using an online application, 1 indicates a browsing service, 2 indicates a virtual machine control service, and 3 indicates an application control service. The Service_Parameter includes: Service_Parameter=0 indicating an identifier of an application, Service_Parameter=1 indicating an identifier of the second terminal, Service_Parameter=2 indicating a specific virtual machine control instruction, and Service_Parameter=3 indicating the application control permission requesting message. It should be noted that, when Service_Parameter=3, that is, when the first terminal requests an application control service from the server, it is required to first apply for permission to control an application from the second terminal, and a specific application control instruction is sent after the second terminal grants the permission to control the application to the first terminal. The server determines, by comparing the Table 1 and the request sent by the terminal, a service state that currently needs to be provided.

TABLE 1

| Parameter | Type | Description |
|---|---|---|
| Service_Type | unsigned char | Which service type is requested by a terminal currently<br>0: online application service<br>1: browsing service<br>2: virtual machine control service<br>3: application control service |
| Service_Parameter | unsigned long | when Service_Type = 0, it indicates an application identifier: app_id<br>when Service_Type = 1, it indicates an identifier of a second terminal: player_id<br>when Service_Type = 2, it indicates a specific virtual machine control instruction<br>when Service_Type = 3, it indicates an application control request message |

For the first terminal side, the first terminal sends, to the server, the browsing request message, the virtual machine control request message, and the application control request message. It should be noted that, the first terminal may also experience the online application by sending an application use request message to the server; however, in this way, sharing of an online application of another terminal is not involved.

For ease of description, it is assumed that before the first terminal sends the browsing request message to the server, the second terminal in a state of using an online application exists, and a process of initiating the online application by the second terminal is that the second terminal sends an application use request message to the server, where the application use request message includes an service application identifier "0"; the server, after receiving the application use request message, allocates a virtual machine for the second terminal, and starts the online application requested by the second terminal on the virtual machine; at the same time, the server forwards the identifier of the second terminal to the virtual machine; then, the server returns virtual machine information (including basic information such as a running state, address information, and/or port information of the virtual machine) corresponding to the virtual machine to the second terminal. Then, the virtual machine of the server establishes a connection with the second terminal, and the virtual machine provides an online application service for the second terminal by querying a user online application permission (which can be understood as account login verification) stored on the server, where the online application process is that the server processes a control instruction uploaded by the second terminal and delivers an audio/video stream to the second terminal.

As for the present invention, first, the first terminal sends the browsing request message to the server, and the server, after receiving the browsing request message sent by the first terminal, detects whether the first terminal has browse permission. The specific implementation process is that the first terminal sends the browsing request to the server, where the browsing request includes a request type "1" and the identifier of the second terminal, and the server verifies, by looking up a permission table, the browse permission of the user of the second terminal. The identifier of the second terminal may be an account or user name set by the user in the application for the user. Moreover, the first terminal acquiring the identifier of the second terminal is involved herein, the process is not in a consideration scope of the present invention, and a specific method may be acquiring from a friend list or acquiring by searching on a portal website, such as, acquiring by searching for a user account of a certain game.

Here, the identifier of the second terminal, the identifier of the first terminal, and the permission of the first terminal are stored on the server. Table 2 is a permission table, where player_id indicates a user id of the second terminal, watcher_id indicates a user id of the first terminal, and Watcher_privilege indicates user id permission of the first terminal, which specifically includes view (browse permission) and View & Control (browse permission and virtual machine control permission). The player_id is UserA, the watcher_id is UserB, and the Watcher_privilege is view, which indicate that the first terminal UserB has permission to browse the second terminal UserA.

TABLE 2

| player_id | Watcher_id | Watcher_privilege |
|---|---|---|
| UserA | UserB | view |
| UserA | UserC | view |
| UserD | UserB | view |
| UserE | UserC | View & Control |
| . . . | . . . | . . . |

If the first terminal has the browse permission, the server synchronously sends, to the first terminal, resource information sent to the second terminal. Here, a specific process is that if the first terminal has the browse permission, the server sends, to the first terminal, virtual machine information (including information such as an address of the virtual machine, port information, time length of an online application, an application name, an application type, and/or application recommendation rating) of the virtual machine being used by the second terminal. The server sends the identifier of the first terminal and browse permission information to the virtual machine, so that establish a connection between the first terminal and the virtual machine; in this case, for the first terminal that has only the browse permission, the server may further send a browsing notification message to the second terminal to notify the second terminal that another user is browsing the online application of the second terminal; the first terminal and the virtual machine establish the connection after performing negotiation on a media capability (including, but not limited to, a network environment, a coding manner, and a frame rate parameter). The virtual machine of the server synchronously sends, to the first terminal, the resource information sent to the second terminal.

If the first terminal does not have the browse permission, the server sends a permission verification request message to the second terminal, where the permission verification request message includes the identifier of the first terminal and information requesting the second terminal to grant the browse permission to the first terminal; so that the second terminal determines, according to the permission verification request message, whether to grant the browse permission to the first terminal, and returns a permission verification notification message; and if the permission verification notification message indicates granting the browse permission to the first terminal, synchronously sends, to the first terminal, the resource information sent to the second terminal. Here, the specific process is that if the first terminal does not have the browse permission, after the first terminal sends a permission verification message (including the identifier of the first terminal and information requesting the second terminal to grant the browse permission to the first terminal)

to the server, the server forwards the permission verification message to the second terminal; the second terminal determines, according to the permission verification message, whether to grant the browse permission to the first terminal, and returns the permission verification message to the server; the server receives the permission verification notification message returned by the second terminal, and if the permission verification notification message indicates not granting the browse permission to the first terminal, the first terminal cannot browse the online application of the second terminal; if the permission verification notification message indicates granting with the browse permission to the first terminal, the server returns the virtual machine information corresponding to the second terminal to the first terminal, and forwards the identifier of the first terminal and a message that indicates that the browse permission is granted to the first terminal to the virtual machine; the first terminal and the virtual machine of the server establish a connection after performing negotiation on a media capability (including, but not limited to a network environment, a coding manner, and a frame rate parameter); and the virtual machine of the server synchronously sends, to the first terminal, the resource information sent to the second terminal.

During the process that the first terminal implements real-time browsing of the online application of the second terminal, the first terminal may also initiate real-time controlling, including controlling on a virtual machine that provides an application for the second terminal and controlling on an application on the virtual machine. The specific process is as follows:

When a message sent by the first terminal is a virtual machine control request message:

First, the first terminal sends the virtual machine control request message to the server, and the server, when receiving the virtual machine control request message sent by the first terminal, detects whether the first terminal is a preset control terminal. The specific implementation process is that the first terminal sends a virtual machine control request message to the server, where the control request message includes: a sending request type "2" (see Table 1) and a specific virtual machine control instruction, including a shutdown or suspension instruction; and the server determines, by looking up a permission table, a control permission of the user of the second terminal. Here, in the permission table shown in Table 2, the player_id is UserE, the watcher_id is UserC, the Watcher_privilege is view&Control, and therefore the first terminal UserE has browse permission and virtual machine control permission for the second terminal UserC.

If the first terminal is the preset control terminal, the server executes the control command in the virtual machine control request message to control the virtual machine that provides the online application for the second terminal, including shutting down or suspending the virtual machine herein.

When the first terminal sends an application control request message:

First, the first terminal sends the application control request message to the server, where the application control request message is used to apply for permission to control an application that provides an online application service for the second terminal; the server receives the application control request message sent by the first terminal, where the application control permission request message includes the identifier of the first terminal, and sends the application control permission request message to the second terminal; the user of the second terminal decides, according to the identifier of the first terminal in the application control permission request message, whether to grant permission to control an application to the first terminal, and returns a application control permission notification message to the server; if the application control permission notification message indicates not granting the permission to control the application to the first terminal, the first terminal cannot control the online application of the second terminal, and if the application control permission notification message indicates granting the permission to control the application to the first terminal, control permission of the two terminals for the application on the virtual machine is exchanged, the first terminal controls the online application of the second terminal on the virtual machine, and sends audio/video information on the virtual machine to the second terminal while sending the audio/video information to the first terminal at the same time to implement sharing.

The embodiment of the present invention provides a real-time sharing method in an online application, so that a user can actively send a request to another terminal according to a personal requirement, and implement real-time browsing of resources of an online application of another terminal when having the browse permission; at the same time, the user can implement a shutdown or suspension operation on the virtual machine that is on the server and provides an online service for another terminal, and in addition, when the user is granted permission, the user may acquire, by sending an instruction to the server, control permission for an online application of another user, and control display information of a terminal of another user, thereby implementing real-time sharing in the online application, further improving functions of the online application and improving the quality of user experience in the online application.

Figure 5:
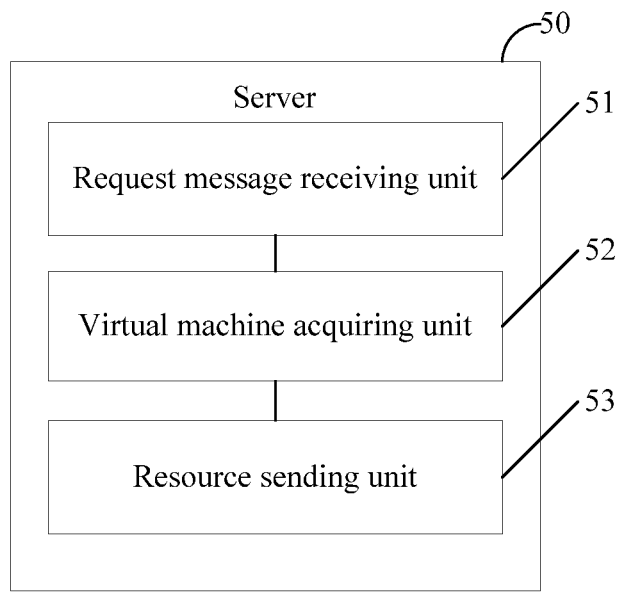
FIG. 5 is a structural block diagram of a server according to an embodiment of the present invention.

A server 50 provided in an embodiment of the present invention, as shown in FIG. 5, includes: a request message receiving unit 51, a virtual machine acquiring unit 52, and a resource sending unit 53.

The request message receiving unit 51 is configured to receive a browsing request message sent by a first terminal, where the browsing request message carries an identifier of a second terminal.

The virtual machine acquiring unit 52 is configured to acquire, according to the identifier of the second terminal, virtual machine information of a virtual machine that provides an online application service for the second terminal.

The resource sending unit 53 is configured to send, to the first terminal, resource information sent to the second terminal by the virtual machine corresponding to the virtual machine information.

Therefore, the user can actively send the browsing request to another terminal according to a personal requirement to implement real-time browsing of resources of the online application of the second terminal, thereby further improving functions of the online application and improving the quality of the user experience in the online application.

Figure 6:
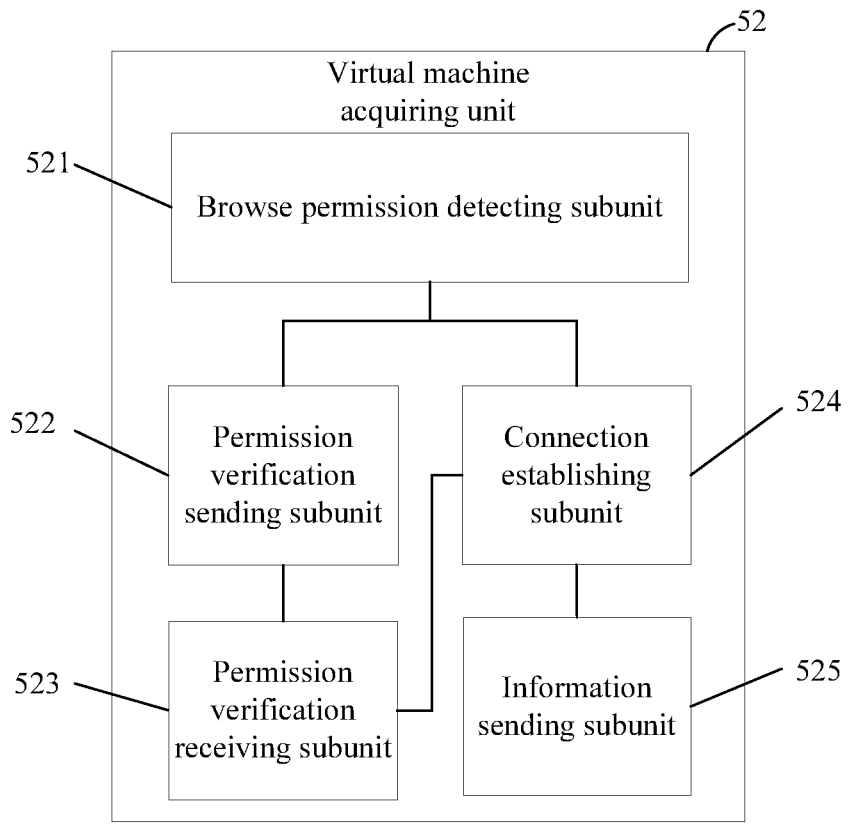
FIG. 6 is a structural block diagram of a virtual machine acquiring unit according to an embodiment of the present invention.

Further, as shown in FIG. 6, the virtual machine acquiring unit 52 further includes a browse permission detecting subunit 521, a permission verification sending subunit 522, a permission verification receiving subunit 523, a connection establishing subunit 524, and an information sending subunit 525.

The browse permission detecting subunit 521 is configured to detect whether the first terminal has permission to browse an online application being used by the second terminal when the browsing request message sent by the first terminal is received.

The permission verification sending subunit 522 is configured to, when the first terminal does not have the browse permission, send a permission verification request message to the second terminal, where the permission verification request message includes an identifier of the first terminal and information requesting the second terminal to grant the browse permission to the first terminal, so that the second terminal determines, according to the identifier of the first terminal, whether to grant the browse permission to the first terminal.

The permission verification receiving subunit 523 is configured to receive a permission verification notification message returned by the second terminal, and determine, according to the permission verification notification message, that the first terminal has the browse permission.

The information sending subunit 524 is configured to, when the first terminal has the permission to browse the online application being used by the second terminal, send, to the first terminal, the virtual machine information of the virtual machine that provides the online application service for the second terminal, and is further configured to, when the permission verification notification message indicates granting the browse permission to the first terminal, send, to the first terminal, the virtual machine information of the virtual machine that provides the online application for the second terminal.

The connection establishing subunit 524 is configured to establish a connection between the first terminal and the virtual machine.

Figure 7:
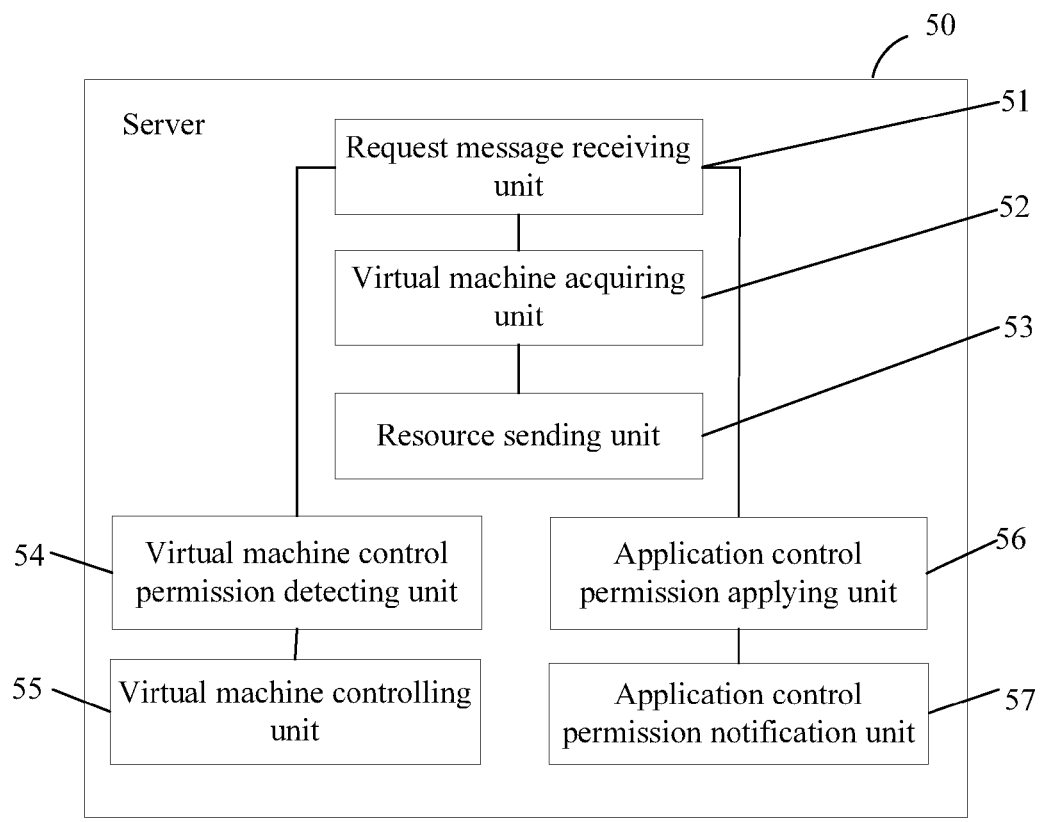
FIG. 7 is a structural block diagram of another server according to an embodiment of the present invention.

Further, as shown in FIG. 7, the server 50 provided in an embodiment of the present invention further includes: a virtual machine control permission detecting unit 54 configured to, when a virtual machine control request message sent by the first terminal is received, detect whether the first terminal is a preset control terminal; a virtual machine controlling unit 55 configured to, when the first terminal is the preset control terminal, control the virtual machine according to the control command in the virtual machine control request message; an application control permission application unit 56 configured to send an application control permission request message to the second terminal, where the application control permission request message includes the identifier of the first terminal and an application identifier, so that the second terminal determines, according to the identifier of the first terminal and the application identifier, whether to grant permission to control an application to the first terminal, and returns an application control permission notification message; and an application control permission notification unit 57 configured to send the application control permission notification message to the first terminal, so that when the application control permission notification message indicates granting the permission to control the application to the first terminal, the first terminal controls the application that provides the online application service for the second terminal.

The request message receiving unit 51 is further configured to receive the virtual machine control request message sent by the first terminal, where the virtual machine control request message includes a control command used to control the virtual machine that provides resource information for the second terminal; receive the application control request message sent by the first terminal, where the application control request message is used to apply for permission to control the application that provides the online application service for the second terminal.

Figure 8:
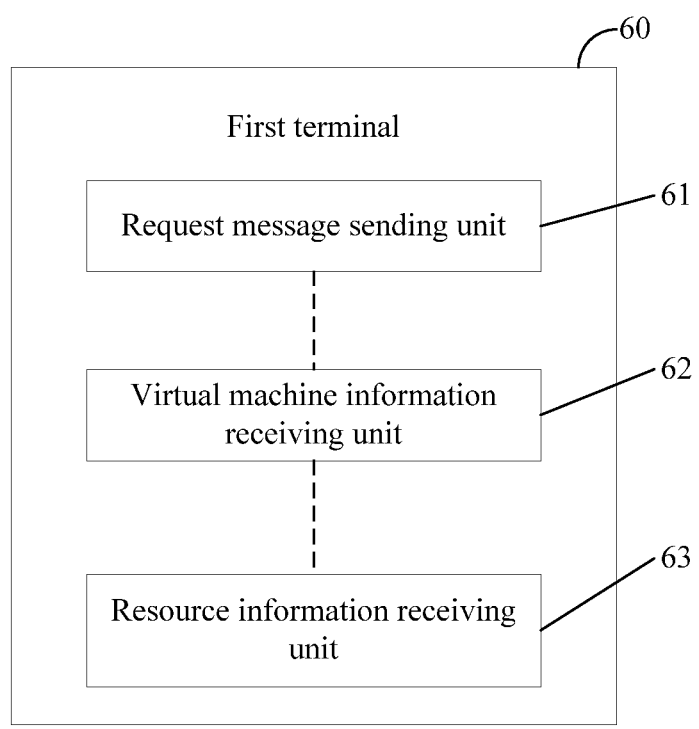
FIG. 8 is a schematic structural diagram of a first terminal according to an embodiment of the present invention.

A first terminal 60 provided in an embodiment of the present invention, as shown in FIG. 8, includes: a request message sending unit 61, a virtual machine information receiving unit 62, and a resource information receiving unit 63.

The request message sending unit 61 is configured to send a browsing request message to a server, where the browsing request message carries an identifier of a second terminal, so that the server acquires, according to the identifier of the second terminal, virtual machine information of a virtual machine that provides an online application service for the second terminal.

The virtual machine information receiving unit 62 is configured to receive the virtual machine information of the virtual machine that provides the online application service for the second terminal when the first terminal has permission to browse an online application being used by the second terminal.

The resource information receiving unit 63 is configured to receive resource information sent to the second terminal by the virtual machine corresponding to the virtual machine information.

Figure 9:
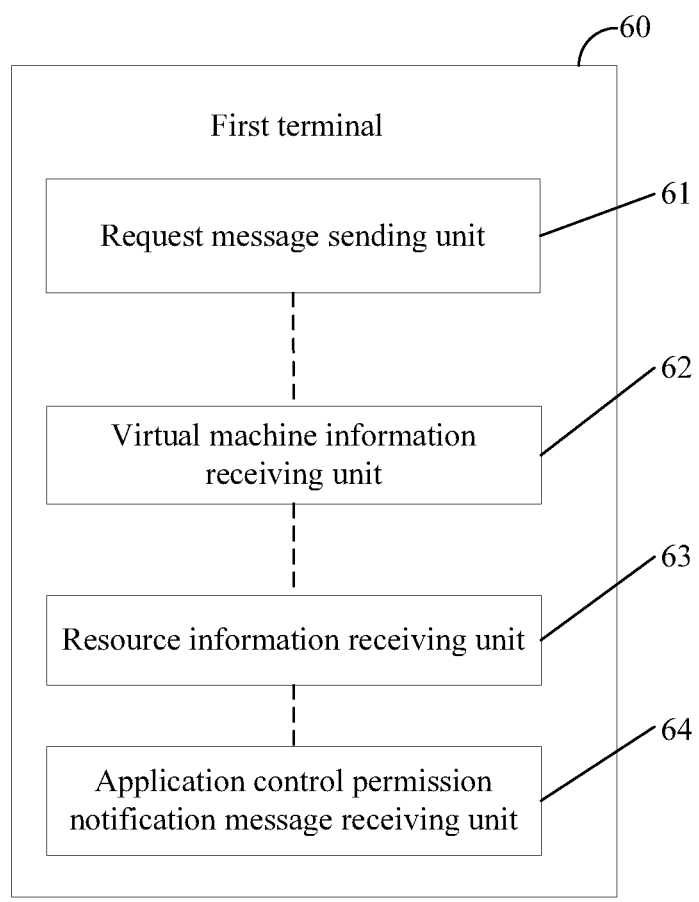
FIG. 9 is a schematic structural diagram of another first terminal according to an embodiment of the present invention.

Further, another first terminal 60 provided in an embodiment, as shown in FIG. 9, includes an application control permission notification message receiving unit 64.

The application control permission notification message receiving unit 64 is configured to receive an application control permission notification message, so that when the application control permission notification message indicates granting permission to control an application to the first terminal, the first terminal controls the application that provides the online application service for the second terminal.

The request message sending unit 61 is further configured to send a virtual machine control request message to the server, where the virtual machine control request message includes a control command used to control the virtual machine that provides the resource information for the second terminal, so that the server, when detecting that the first terminal is a preset control terminal, controls the virtual machine according to the control command in the virtual machine control request message, and is further configured to send an application control request message to the server, where the application control request message is used to apply for permission to control the application that provides the online application service for the second terminal.

The embodiment of the present invention provides a real-time sharing apparatus in an online application, so that a user can actively send a request to another user according to a personal requirement, and can implement real-time browsing of resources of an online application of another terminal when having browse permission; at the same time, if the user is in a state of having control permission, the user may suspend or shut down a virtual machine, on a server, that provides an online service for another terminal; when being granted permission, the user may acquire control permission of an online application of another user by sending an instruction to the server, and control display information of a terminal of another user, thereby implementing real-time sharing in the online application, further improving functions of the online application and improving the quality of user experience in the online application.

Figure 10:
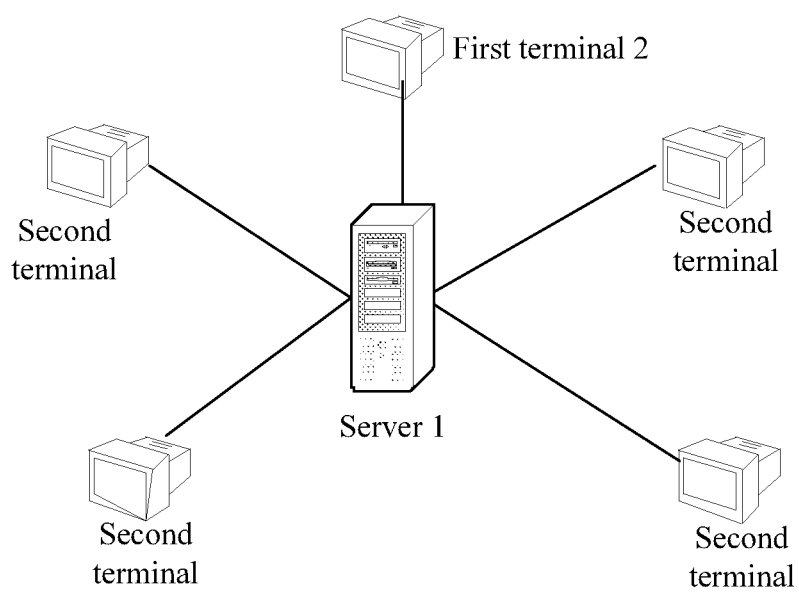
FIG. 10 is a schematic diagram of a real-time sharing system according to an embodiment of the present invention.

A real-time sharing system in an online application provided in an embodiment of the present invention, as shown in FIG. 10, includes a server 1 and a first terminal 2.

The server 1 is configured to receive a browsing request message sent by the first terminal, where the browsing request message carries an identifier of a second terminal; acquire, according to the identifier of the second terminal, virtual machine information of a virtual machine that provides an online application service for the second terminal; and send, to the first terminal, resource information sent to the second terminal by the virtual machine corresponding to the virtual machine information.

The first terminal 2 is configured to send the browsing request message to the server.

The server 1 is further configured to: detect whether the first terminal has permission to browse an online application being used by the second terminal; when the first terminal has the permission to browse the online application being used by the second terminal, send, to the first terminal, the virtual machine information of the virtual machine that provides the online application service for the second terminal; establish a connection between the first terminal and the virtual machine; and send, to the first terminal by using the established connection, the resource information that runs on the virtual machine corresponding to the virtual machine information.

The server 1 is further configured to, when the first terminal does not have the browse permission, send a permission verification request message to the second terminal, where the permission verification request message includes an identifier of the first terminal and information requesting the second terminal to grant the browse permission to the first terminal, so that the second terminal determines, according to the identifier of the first terminal, whether to grant the browse permission to the first terminal; and receive a permission verification notification message returned by the second terminal, and determine, according to the permission verification notification message, that the first terminal has the browse permission.

The server 1 is further configured to receive a virtual machine control request message sent by the first terminal, where the virtual machine control request message includes a control command used to control a virtual machine that provides the resource information for the second terminal; detect whether the first terminal is a preset control terminal; and when the first terminal is the preset control terminal, control the virtual machine according to the control command in the virtual machine control request message, where the application control permission request message includes the identifier of the first terminal and an application identifier.

The first terminal 2 is further configured to send an application control request message to the server, where the application control request message is used to apply for permission to control an application on the virtual machine that provides the online application service.

The server 1 is further configured to send an application control permission request message to the second terminal when receiving an application control message, where the application control permission request message includes the identifier of the first terminal and an application identifier.

The second terminal is configured to receive the application control permission request message, determine, according to the identifier of the first terminal and the application identifier, whether to grant permission to control an application to the first terminal, and then return an application control permission notification message.

The server 1 is further configured to send the application control permission notification message to the first terminal, so that when the application control permission notification message indicates granting the permission to control the application to the first terminal, the first terminal controls an application that provides the online application service for the second terminal.

The embodiment of the present invention provides a real-time sharing system in an online application, so that a user can actively send a request to another terminal by using a terminal according to a personal requirement to implement real-time sharing of resources of the online application of another terminal, thereby further improving functions of the online application and improving the quality of user experience in the online application.

The embodiments of the present invention provide a real-time sharing method, apparatus and system, so that a user can actively send a request to a terminal of another user according to a personal requirement in an online application scenario, and can implement real-time browsing of resources of an online application of another terminal when having browse permission; at the same time, if the user is in a state of having control permission, the user may suspend or shut down a virtual machine, on a server, that provides an online service for another terminal; when being granted permission, the user may acquire control permission of an online application of another user by sending an instruction to the server, and control display information of the terminal of another user, thereby implementing real-time sharing in the online application, further improving functions of the online application and improving the quality of user experience in the online application.

The server in the foregoing embodiments of the present invention may be a hardware device such as a computer, the method for executing the foregoing functions may be performed by a processor of a computer, and the functional units of the server may also be units in the processor of the computer. The terminal may be any terminal device, such as a mobile phone, a personal digital assistant (PDA), a notebook computer, and a computer, which is not limited in the present invention. Each function unit of the terminal may be a receiver of the terminal.

A person of ordinary skill in the art may understand that all or a part of the steps of the methods in the embodiments may be implemented by a computer program instructing relevant hardware. The program may be stored in a computer readable storage medium. When the program runs, the steps of the methods in the embodiments are performed. The foregoing storage medium includes any medium that can store program code, such as a read only memory (ROM), a random access memory (RAM), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A real-time sharing method applied to an online application system, comprising:
receiving, by a server, a browsing request message sent by a first terminal to request synchronously browsing resources of an online application that are also being used by a second terminal, wherein the browsing request message comprises an identifier of the second terminal;
acquiring, by the server and according to the identifier of the second terminal, virtual machine information of a virtual machine that provides an online application service for the second terminal;

sending, by the server, the virtual machine information to the first terminal;

establishing a connection between the first terminal and the virtual machine; and sending, by the virtual machine to the first terminal using the established connection, resource information that is also being sent to the second terminal, wherein the resource information includes at least one of audio streams or video streams on the virtual machine that are being provided for the second terminal.

2. The method according to claim 1, wherein before sending the resource information to the first terminal, the method further comprises detecting whether the first terminal has permission to browse the online application being used by the second terminal.

3. The method according to claim 2, wherein when the first terminal does not have the permission to browse the online application being used by the second terminal, the method further comprises:

sending a permission verification request message to the second terminal, wherein the permission verification request message comprises an identifier of the first terminal and information requesting the second terminal to grant the permission to the first terminal, wherein the second terminal determines, according to the identifier of the first terminal, whether to grant the permission to the first terminal; and receiving a permission verification notification message returned by the second terminal.

4. The method according to claim 1, wherein after sending the resource information to the first terminal, the method further comprises:

receiving a virtual machine control request message from the first terminal, wherein the virtual machine control request message comprises a control command used to control the virtual machine that provides the resource information for the second terminal;

detecting whether the first terminal is a preset control terminal; and controlling the virtual machine according to the control command in the virtual machine control request message based on the determination that the first terminal is the preset control terminal.

5. The method according to claim 1, wherein after sending the resource information to the first terminal, the method further comprises:

receiving an application control request message sent by the first terminal, wherein the application control request message is used to apply for permission to control an application on the virtual machine that provides the online application service for the second terminal;

sending an application control permission request message to the second terminal, wherein the application control permission request message comprises the identifier of the first terminal, wherein the second terminal is configured to:

return an application control permission notification message; and sending the application control permission notification message to the first terminal, and wherein the first terminal controls the application that provides the online application service for the second terminal based on the determination that the application control permission notification message indicates granting the permission to control the application to the first terminal.

6. A terminal, comprising:

a processor;

a transmitter coupled to the processor and configured to send a browsing request message to a server to request synchronously browsing resources of an online application that are also being used by a second terminal, wherein the browsing request message eafie-ompises an identifier of the second terminal; and a receiver coupled to the processor and configured to receive, from the server, virtual machine information of a virtual machine that provides an online application service for the second terminal, wherein the virtual machine information is acquired by the server according to the identifier of the second terminal, wherein the transmitter is further configured to send a connection request to the virtual machine according to the virtual machine information to establish a connection with the virtual machine, wherein the receiver is further configured to receive resource information from the virtual machine using the established connection, wherein the resource information has also synchronously been sent to the second terminal, and wherein the resource information includes at least one of audio streams or video streams on the virtual machine that are being provided for the second terminal.

7. The terminal according to claim 6, wherein the transmitter is further configured to send a virtual machine control request message to the server, wherein the virtual machine control request message comprises a control command used to control the virtual machine that provides the resource information for the second terminal, and wherein the server is configured to control the virtual machine according to the control command in the virtual machine control request message when detecting that the first terminal is a preset control terminal.

8. The terminal according to claim 6, wherein the transmitter is further configured to send an application control request message to the server, wherein the application control request message is used to apply for permission to control the application that provides the online application service for the second terminal, wherein the receiver is further configured to receive the application control permission notification message, and wherein the first terminal controls the application that provides the online application service for the second terminal when the application control permission notification message indicates that the permission to control the application has been granted to the first terminal.

9. A real-time sharing system, comprising:

a server configured to:

receive a browsing request message sent by a first terminal to request synchronously browsing resources of an online application that are also being used by a second terminal, wherein the browsing request message comprises an identifier of the second terminal;

acquire, according to the identifier of the second terminal, virtual machine information of a virtual machine that provides an online application service for the second terminal; and send the virtual machine information to the first terminal; and a virtual machine configured to:

receive a connection request sent by the first terminal to establish a connection with the virtual machine;

establish a connection with the first terminal in response to the connection request; and send, to the first terminal using the established connection, resource information that has also synchronously been sent to the second terminal, wherein the resource information includes at least one of audio streams or video streams on the virtual machine that are being provided for the second terminal.

10. The system according to claim 9, wherein the server is further configured to detect whether the first terminal has permission to browse an online application being used by the second terminal.

11. The system according to claim 10, wherein the server is further configured to:

send a permission verification request message to the second terminal based on the determination that the first terminal does not have the permission, wherein the permission verification request message comprises an identifier of the first terminal and information requesting the second terminal to grant the permission to the first terminal, wherein the second terminal determines, according to the identifier of the first terminal, whether to grant the browse permission to the first terminal; and receive a permission verification notification message from the second terminal.

12. The system according to claim 9, wherein the server is further configured to:

receive a virtual machine control request message sent by the first terminal, wherein the virtual machine control request message comprises a control command used to control the virtual machine that provides the resource information for the second terminal;

detect whether the first terminal is a preset control terminal; and control the virtual machine according to the control command in the virtual machine control request message based on the determination that the first terminal is the preset control terminal.

* * * * *

UNITED STATES PATENT AND TRADEMARK OFFICE
CERTIFICATE OF CORRECTION

PATENT NO. : 9,553,826 B2
APPLICATION NO. : 14/197415
DATED : January 24, 2017
INVENTOR(S) : Jin Qin, Pei Dang and Deepanshu Gautam It is certified that error appears in the above-identified patent and that said Letters Patent is hereby corrected as shown below:

In the Claims

Column 20, Line 7, Claim 6 should read:
"wherein the browsing request message comprises an identifier of the second terminal; and"

Signed and Sealed this
Second Day of May, 2017

Michelle K. Lee
*Director of the United States Patent and Trademark Office*